US008369362B2

(12) United States Patent
Abou-Chakra et al.

(10) Patent No.: US 8,369,362 B2
(45) Date of Patent: *Feb. 5, 2013

(54) AUDIO AND VIDEO DATA PROCESSING DEVICE FOR MULTIMEDIA COMMUNICATION VIA A LOCAL NETWORK SET UP WITHIN AN ASYNCHRONOUS NETWORK

(75) Inventors: Rabih Abou-Chakra, Cormeilles en Parisis (FR); Philippe Burger, Mutzig (FR)

(73) Assignee: Alcatel Lucent, Paris (FR)

( * ) Notice: Subject to any disclaimer, the term of this patent is extended or adjusted under 35 U.S.C. 154(b) by 1159 days.

This patent is subject to a terminal disclaimer.

(21) Appl. No.: 10/766,842

(22) Filed: Jan. 30, 2004

(65) Prior Publication Data

US 2005/0053089 A1    Mar. 10, 2005

(30) Foreign Application Priority Data

Jan. 31, 2003 (FR) ...................................... 03 01105

(51) Int. Cl.
*H04J 3/06* (2006.01)
(52) U.S. Cl. .............................. 370/503; 725/74; 725/98
(58) Field of Classification Search .................... 725/74, 725/78, 82, 98; 370/230, 464, 260; 395/200.65, 395/153; 348/207, 505; 375/240.8
See application file for complete search history.

(56) References Cited

U.S. PATENT DOCUMENTS

| | | | |
|---|---|---|---|
| 5,594,660 A | 1/1997 | Chan | |
| 5,598,352 A | 1/1997 | Daum | |
| 5,663,951 A * | 9/1997 | Danneels et al. | 370/230 |
| 5,844,600 A * | 12/1998 | Kerr | 348/14.12 |
| 6,173,317 B1 | 1/2001 | Chaddha | |
| 6,512,778 B1 | 1/2003 | Geagan | |
| 7,043,749 B1 * | 5/2006 | Davies | 725/120 |
| 7,280,650 B2 * | 10/2007 | Miao | 379/202.01 |
| 7,483,523 B2 * | 1/2009 | Abou-chakra et al. | 379/90.01 |

OTHER PUBLICATIONS

Ishibashi et al, A Synchronization Mechanism for Continuous Media in Multimedia Communication, INFOCOM '95. Fourteenth Annual Joint Conference of the IEEE Computer and Communications Societies. Bringing Information to People. Proceedings. IEEE Apr. 2-6, 1995 pp. 1010-1019 vol. 3.*
Little et al, Network and Operating Systems Support for Digital Audio and Video: Proceedings, 5th International Workshop on Network and Operating Systems Support for Digital Audio and Video, Springer 1995.*
Keshab et al, Digital Signal Processing for Multimedia Systems, CRC Press 1999 p. 245 and 274.*

* cited by examiner

*Primary Examiner* — Kevin C Harper
*Assistant Examiner* — Henry Baron
(74) *Attorney, Agent, or Firm* — Sughrue Mion, PLLC

(57) ABSTRACT

A device is dedicated to the processing of audio and video data for multimedia communication, via an asynchronous network, between first LAN audio and video terminals and second LAN audio and video terminals. This device includes i) a connector which establishes communications with the first LAN audio and video terminals and with other connectors installed in another device, ii) a first dating module which attaches a transmit time mark and an identifier to the audio and video data emitted by the first LAN audio and video terminals, before their transmission to the other connector and iii) a processor which determines a time difference representing the transmission time difference between the received audio and video data and presenting the same identifier.

15 Claims, 3 Drawing Sheets

AUDIO AND VIDEO DATA PROCESSING DEVICE FOR MULTIMEDIA COMMUNICATION VIA A LOCAL NETWORK SET UP WITHIN AN ASYNCHRONOUS NETWORK

BACKGROUND OF THE INVENTION

1. Field of the Invention

The invention concerns the area of asynchronous networks with random transmission times, and more particularly multimedia communications linking together audio communication terminals of the LAN (Local Area Network) type, and video communication terminals, also of the LAN type, within such networks.

2. Description of the Related Art

By "audio communication terminal" is meant here any communicating network equipment capable of exchanging audio data, such as a fixed or mobile telephone for example, or a personal digital assistant (PDA). Likewise, by "video communication terminal" is meant here any communicating network equipment capable of exchanging video data, such as an individual computer for example.

In asynchronous networks with random transmission times, when, for example, two people, having activated a communication between their first* audio or video LAN communication terminals via a local area network (LAN) and a communication network, decide during the communication to communicate packets of audio or video data to each other, via second* audio or video LAN terminals respectively, independently of the first* terminals used, offset timing usually occurs between the packets of audio data and the packets of video data coming from a given user. More precisely, the audio packets generally arrive before the video packets, representing a nuisance for the user receiving the data.

This offset timing results mainly from the "non-deterministic" character of the transmission of data packets within asynchronous packet-switched networks, such as IP protocol networks for example. By "non-deterministic" is meant here the fact of being of a variable character which is not controllable over time (i.e. of a random nature). In fact, the streams of audio data packets and the streams of video data packets, due to their different natures, generally do not follow the same routes within the network and generally do not have identical priority levels. In addition, the routes taken even by data packets of the same type can vary.

But the offset timing results also from differences in the coding/decoding times of the video and audio data.

In order to attempt to improve the situation, it has been proposed that all of the audio streams should be delayed, in an automatic manner and by a constant value, in relation to the video streams. However, this constant delay enables one to overcome only the non-random transmission-time differences, such as those introduced by the coding/decoding operations, and these are not the most detrimental ones.

BRIEF SUMMARY OF THE INVENTION

In addition, the MPEG4 standard provides a mechanism which can be used to synchronize audio and video data, but the latter concerns only situations in which the audio and video data come either from a single communication terminal or from two independent but synchronized communication terminals.

The purpose of the invention is therefore to remedy the aforementioned drawback. To this end, it proposes an audio and video data processing device for multimedia communication, via an asynchronous network with random transmission times, between, on the one hand, a first pair consisting of a first audio communication terminal and a first video communication terminal, and on the other hand, a second pair consisting of a second audio communication terminal and a second video communication terminal, the said terminals being all of the LAN type; where at least the first pair consists of independent and asynchronous terminals; characterized in that it includes, in association with this first pair, connection means for the setting up of:

- a video link between these connection means and the video terminal of the first pair,
- an audio link between these connection means and the audio terminal of the first pair,
- a video link between these connection means and the second pair,
- an audio link between these connection means and the second pair.

By means of this processing device, it is possible to associate a video terminal and an audio terminal, of the independent and asynchronous LAN type, for the setting up of a multimedia communication with another pair of terminals, thereby reducing the offset timing between the video and audio packets received by the recipient pair of terminals. In fact, the fact that the two data streams are brought to a single point (the processing device) by the links ed by the processing device, brings about a first synchronization of these streams, before transmitting them over the links which will desynchronize them.

This first synchronization does not prevent the offset timing which then caused by the transmission to the receiving terminals, but it facilitates a second synchronization by making available a common synchronization reference for the video and the audio, while the two terminals of the first pair are intrinsically asynchronous.

According to a preferred method of implementation, the said connection means include:

First dating means arranged, on the one hand, to attach a transmit time mark and an identifier to audio data and video data, coming from the said first audio and video communication terminal respectively, before their transmission to the second pair via the said local network, and on the other hand, to attach a receive time mark to audio and video data coming from the is said second pair and containing an identifier and a transmit time mark, and local processing means to determine a time difference representing the transmission time difference between the audio data and the video data received and bearing the same identifier, from their respective transmit and receive time marks, and to delay, by a value representing the said time difference, the transmission of the said audio data received at the said first audio communication terminal in relation to the transmission of the said video data received at the said first video communication terminal.

By means of this double time marking, at transmission and reception, it is possible to determine the transmission time difference between the audio and video data, for the non-deterministic part of the network that they follow, and then to make up for this difference by delaying transmission of the audio data to the receiving audio communication terminal. The second synchronization mentioned above has thus been achieved.

The processing means are arranged preferably so as to determine a time difference which is representative not only of the transmission time difference but also of the coding/ decoding time difference between the audio and video data received and presenting the same identifier.

In addition, the processing means are preferably capable of determining the time difference not only from the transmit and receive time markings of the audio and video data received, but also from values representing their respective transmission times between the second audio and video communication terminals which sent them and the other connection means of the other device, in particular when the links associated with these times are of the deterministic type.

As a variant or as an addition, the processing means can be arranged so as to determine the time difference not only from the transmit and receive time markings of the audio and video data received, but also from values representing their respective transmission times between the connection means and the first* audio and video communication terminals for which they are intended, in particular when the links associated with these times are of the deterministic type.

Preferably, the processing means include a buffer memory in which they temporarily store the audio data to be delayed before being communicated to the connection means with a view to their transmission to the first audio communication terminal.

The dating means can also be arranged so as to attach data representing a priority level to the audio and video data to be transmitted to the other connection means of the other device, the priority level associated with the video data preferably being lower than that associated with the audio data.

In addition, it is advantageous that the connection means should provide a function of the proxy type for both the audio and video data.

The invention also concerns an audio communication terminal, a video communication terminal, and a dedicated communication unit, each fitted with a processing device of the type presented above.

BRIEF DESCRIPTION OF THE DRAWINGS

The invention is particularly well suited, though not in any limited manner, to communications involving an asynchronous IP protocol network.

Other characteristics and advantages of the invention will appear on examination of the detailed description below, and of the appended drawings, in which.

The appended drawings can serve not only to complete the invention, but also to contribute to its description, as appropriate.

The invention concerns multimedia communications between communication terminals via an asynchronous network with random transmission times and a local network of the LAN (Local Area Network) type, and more precisely multimedia communications between, on the one hand, a first audio communication terminal and a first video communication terminal, which are independent, non-synchronized, and of the LAN type, and on the other hand, a second audio communication terminal and a second video communication terminal, which also are independent, non-synchronized and of the LAN type.

In what follows, we consider, as an example, that the local network is a virtual local network (VLAN) set up within an asynchronous IP protocol network. But, the invention is neither limited to local networks of the virtual type nor to asynchronous IP protocol networks. It concerns all asynchronous networks referred to as "packet-switched" networks, in which the transmission of streams of audio or video data packets is of the non-deterministic (or random) type.

In addition, in what follows, we consider, as an example, that each audio LAN communication terminal is a mobile telephone equipped so as to be able to exchange audio data via the local (virtual) network. But the invention is not limited to mobile telephones. It concerns all communicating equipment capable of exchanging audio data via the local (virtual) network, and personal digital assistants (PDA) in particular.

In addition, in what follows, we consider, as an example, that each LAN video communication terminal is an individual computer equipped so as to be able to exchange video data via the local (virtual) network, and possibly coupled with a video camera. But the invention is not limited to individual computers (whether fixed or portable). It concerns all communicating equipment capable of exchanging video data via the local (virtual) network.

As a consequence, in what follows, the expressions "mobile telephone" and "computer" refer to an audio communication IP terminal and a video communication IP terminal respectively, and the expression "local network" refers to a virtual local network (VLAN) set up within the IP network between the different audio and video terminals.

The invention proposes a processing device which is intended to allow to a user to receive, in a synchronized manner, for his (or her) mobile telephone and computer (which are independent and non-synchronized), audio and video data coming from the mobile telephone and the computer (which are also independent and non-synchronized) of another user.

Figure 1:
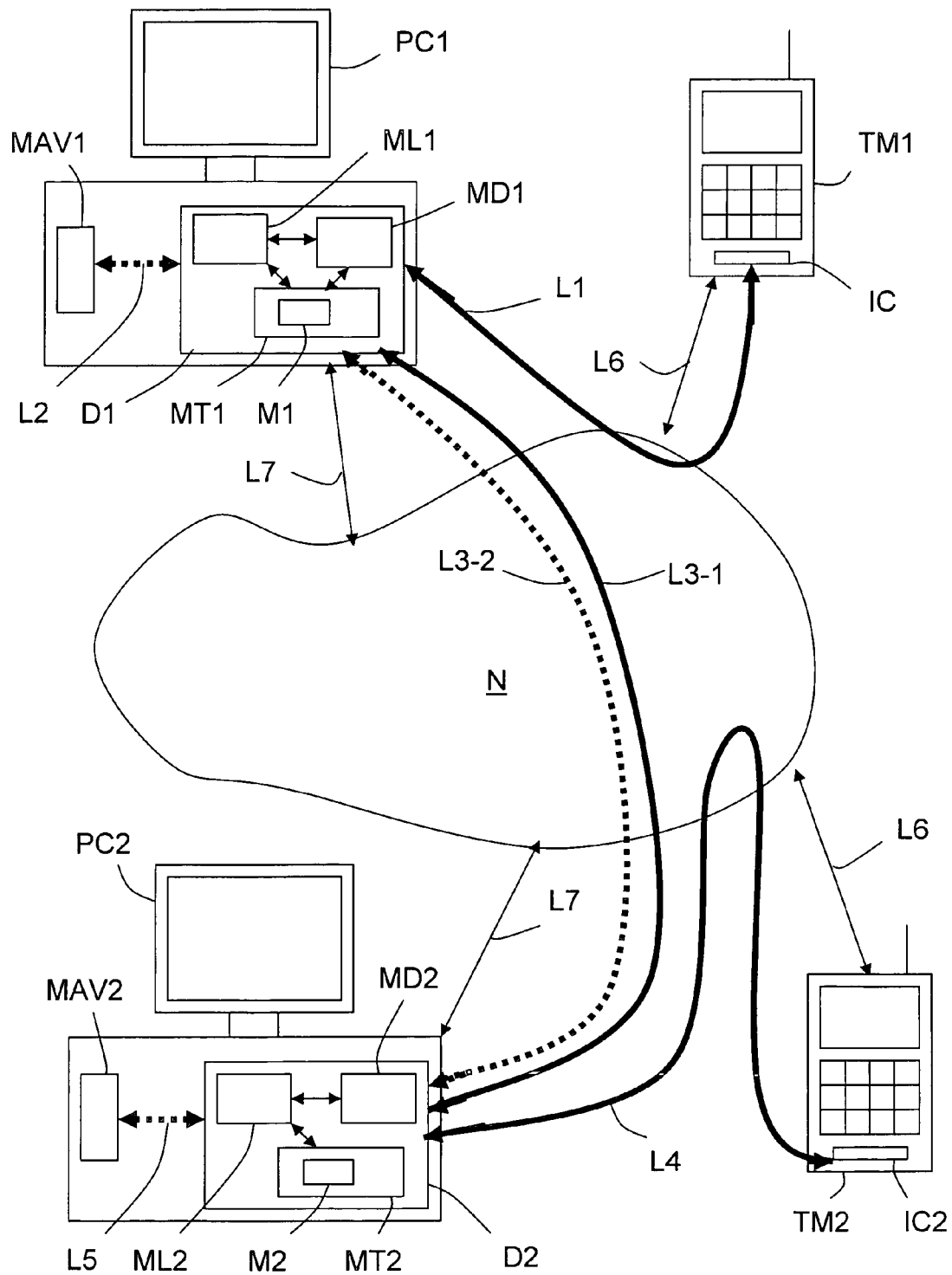
FIG. 1 schematically illustrates an example of implementation of a video communication terminal equipped with a device according to the invention, FIG. 2 schematically illustrates an example of implementation of an audio communication terminal equipped with a device according to the invention, and FIG. 3 schematically illustrates an example of implementation of a dedicated communication unit equipped with a device according to the invention.

Reference is made to FIG. 1 in order to describe an example of implementation of devices according to the invention, installed in the computers (or PCs) of users.

In this example, a first user has a first pair consisting of a first mobile telephone (TM1) and a first computer (PC1) containing video data (or connected to a video camera, such as a "web camera" for example, delivering video data). Likewise, a second user has a second pair consisting of a second mobile telephone (TM2) and a second computer (PC2) containing video data (or connected to a video camera, such as a "web camera" for example, delivering video data). In addition, at least one of these two pairs includes independent and asynchronous terminals.

Each computer (PCi, where i=1 and 2) is equipped with a processing device (Di) according to the invention, consisting of a link module (MLi), a dating module (MDi) and a processing module (MTi), coupled to each other. In addition, each computer (PCi) includes a video application module (MAVi) coupled to the device (Di) so as to supply it with video data stored in a memory or coming from a video camera.

The mobile telephones (TMi) include an audio application module (not shown) which supplies audio data to an IP-LAN communication interface (ICi) allowing the exchange of audio data via the local network established within the IP network (N).

The link module (MLi) of a device (Di—the first, for example) is programmed to activate, when its user wishes to exchange both audio and video data with the other user (employing methods which will be detailed later), firstly, a link (L1) with the first mobile telephone (TM1) for transmission of the audio data, secondly, a link (L2) with the video application module (MAV1) of the computer (PC1) for transmission of the video data, and thirdly, two links (L3-1 and L3-2) with the link module (ML2) of the second device (D2—installed in the computer (PC2) of the second user) for transmission of the audio data and the video data.

Preferably, the link module (MLi) provides a function of the proxy type for both audio and video data.

In this example, the link (L1) between the first mobile telephone (TM1) and the first computer (PC1) is set up via a switch (or "hub") of the local network. This IP-LAN link (L1) is therefore of the deterministic type, which provides advance knowledge of the time (T1) necessary for the transmission of audio data packets between the first mobile telephone (TM1) and the first device (D1). Since the internal link (L2) is made within the first computer (PC1), it is also deterministic. The time (T2) necessary for the transmission of video data packets between the video application module (MAV1) and the first device (D1) is therefore also known in advance.

On the other hand, the IP-LAN links (L3-1 and L3-2) between the first (D1) and second (D2) devices are set up via routes of the IP network (N) which cannot be known in advance. Since these links (L3-1 and L3-2) are of the non-deterministic (or random) type, it is therefore not possible to have advance knowledge of the times (T3-1 and T3-2) necessary for transmission of the audio data packets and of the video data packets between the first (D1) and second (D2) devices.

When the link modules (ML1 and ML2) of the first (D1) and second (D2) devices have set up their IP-LAN links (L3-1 and L3-2), the link module (ML2), in its turn, establishes a link (L4) with the second mobile telephone (TM2) and a link (L5) with the video application module (MAV2) of the second computer (PC2).

In this example, the link (L4) between the second mobile telephone (TM2) and the second computer (PC2) is also made via a switch (or hub) of the local network. This IP-LAN link (L4) is therefore also of the deterministic type, which provides advance knowledge of the time (T4) necessary for the transmission of audio data packets between the second mobile telephone (TM2) and the second device (D2). Since the internal link (L5) is set up within the second computer (PC2), it is also deterministic. The time (T5) necessary for the transmission of video data packets between the video application module (MAV1) and the second device (D2) is therefore also known in advance.

In the figures, the solid thick lines with double arrow represent the paths taken by the streams of audio data packets, while the dotted thick lines with double arrow represent the paths taken by the streams of video data packets.

The dating module (MDi) of each device (Di) is charged with two tasks. A first task consists of attaching a transmit time mark and a stream identifier to each packet (or stream of packets) allowing the setting up of a correspondence between the audio and video data, each time that audio data packets and video data packets must be transmitted from a sending device or (the first (D1), for example) to a receiving device (the second (D2) for example), via the IP-LAN links (L3-1 and L3-2). A second task consists of attaching a receive time mark to each received packet (or stream of packets), each time that audio data packets and video data packets have been received from a sending device (the second (D2) for example), via the IP-LAN links (L3-1 and L3-2),

DETAILED DESCRIPTION OF THE
EXEMPLARY EMBODIMENTS OF THE
INVENTION

Time marking refers here to an item of data representing an instant (of transmission or reception) determined by a clock of the device (Di).

It is also preferable that the dating module (MDi) should attach data representing its priority level to each audio or video data packet, taking account of its nature (audio or video). Still more preferably, the priority level associated with the video data packets is lower than that associated with the audio data packets. This priority level marking is preferably performed at the same time as the time marking. It is used to provide coherence between the audio streams and the video streams emitted from the two different sources, in order to guarantee their routing over the local area network (LAN) in optimal conditions and with similar transit times.

In addition, a VLAN identifier is attached to each packet.

The priority-level data and the VLAN identifier attached to each audio or video data packet are presented here in the form of "tags" of the IEEE 802.1 p/Q type, because of the fact that the communications are set up within a virtual local network (VLAN) specified in an IP network.

The data packets (audio or video) received by a receiving device (the first (D1), for example) therefore present a transmit time mark, a receive time mark, a stream identifier, a VLAN identifier, and possibly a priority level, at the output of the dating module (MD1). These marked packets are then transmitted to the processing module (MTi) of the receiving device (Di).

For each marked packet, the processing module (MTi) is programmed to determine a time difference (ET) representing the transmission time difference between audio data and video data having been transmitted virtually simultaneously by the link module (MLj) of the sending device (Dj) and presenting the same stream identifier. This time difference (ET) is determined at least from the transmit and receive time markings of the received audio and video packets. In addition, it is at least representing the transmission time difference (T3-2–T3-1) due to the IP-LAN links (L3-2 and L3-1) taken. However it is also preferably representative of the difference between the video coding/decoding time (TCDV) and the audio coding/decoding time (TCDA), and/or of the transmission time difference (T2–T1) for links L2 and L1, and/or of the transmission time difference (T5–T4) for links L5 and L4.

If possible, the time difference determined is representative of all the aforementioned parameters. In this case, one gets the following relation:

$$ET = T3\text{-}2 - T3\text{-}1 + TCDV - TCDA + T2 - T1 + T5 - T4$$

This relation can be simplified when one considers that the transmission times (T2 and T5) are negligible due to the fact that here the device (Di) and video application module (MAVi) are installed in a single computer (PCi). In this case, the relation can be rewritten:

$$ET = \Delta T3 + TCDV - TCDA + T1 + T4$$

where, $\Delta T3 = T3\text{-}2 - T3\text{-}1$.

Since the audio coding/decoding time (TCDA) and video coding/decoding time (TCDV) are constant and known, just like T1 and T4, the processing module (MTi) therefore only has to determine $\Delta T3$ in order to ascertain the time difference (ET). To this end, it only has to determine, for each received audio packet, a received video packet presenting a transmit time marker which is virtually identical (or in other words a virtually identical instant of transmission) and the same stream identifier. It then determines the time (T3-1) equal to the time difference between the transmit and receive time markings of the audio packet, and the time (T3-2) equal to the time difference between the transmit and receive time markings of the video packet. The processing module (MTi) then only has to perform the subtraction T3-2–T3-1 in order to obtain $\Delta T3$.

Since the transmission of an audio packet is usually faster than that of a video packet, it is not necessary to determine the time difference (ET) for the video packet. In addition it is equal, all but in sign, to that of the associated audio packet.

Once in possession of the time difference (ET) associated with an audio packet, the processing module (MTi) determines a delay, representing this time difference, to be applied to it before transmitting it to the mobile telephone (TMi) for which it is intended. The video packets are transmitted immediately, that is without delay to the link module (MLi) in order to communicate it via the link (L2 or L5) to the recipient video application module (MAVi) so that they can be displayed.

The delayed audio packets are preferably stored in a buffer memory (Mi) for a time equal to the calculated delay, and then they are transmitted to the link module (MLi) in order that it can communicate them via the link (L1 or L4) to the mobile telephone (TMi) in order to be reproduced by its receiver.

The use of a device according to the invention can occur in at least two ways.

A first way concerns the situation in which the two users have set up an audio IP-LAN link (L6) between their mobile telephones (TM1 and TM2), via their IP-LAN communication interfaces (IC1 and IC2) and the local network instituted in the IP network (N). Each mobile telephone (TMi) then knows the IP address of the other mobile telephone (TMj).

At a given instant, the users decide to communicate video data to each other via their computers (PC1 and PC2), at the same time as audio data.

The mobile telephones (TM1 and TM2) then exchange the IP addresses of the computers (PC1 and PC2) with which they are going to be associated respectively. These IP addresses have been supplied to them by their respective users or by a call server, or have been extracted from a memory of each mobile telephone (TMi). Each mobile telephone (TMi) then establishes an IP-LAN link with the associated computer (PCi), in order to indicate to it that it wishes to establish a multimedia (audio/video) communication with another mobile telephone (TMj) and another computer (PCj), for which it is supplying the received IP addresses. Each computer (PCi) then activates the resources necessary for this communication. Since the device (Di) is alerted by the computer (PCi), in which it is installed here, its link module (MLi) then establishes the IP-LAN links (L1 or L4) and internal links (L2 or L5) with the mobile telephone (TMi) and the video application module (MAVi), as well as the IP-LAN audio links (L3-1) and video links (L3-2) with the link module (MLj) of the other device (Dj).

Once these links have been set up, the mobile telephone (TMi-TM1 for example) and the video application module (MAVi-MAV1 for example) can then simultaneously communicate their audio and video data packets to the link module (MLi-ML1 for example), which transmits them to the dating module (MDi-MD1 for example) to which it is coupled. As they arrive, the audio and video packets receive their transmit time mark, their stream identifier, and their VLAN identifier (and possibly the priority-level data) from the dating module (MD1). Then the marked packets are again transmitted to the link module (ML1) so that it can transmit them to the link module (ML2) of the receiving device (D2) over the IP-LAN audio (L3-1) and video (L3-2) links, according to their nature (audio or video).

On receipt of these packets, the link module (ML2) transmits them to the dating module (MD2) to which it is coupled. As they arrive, the audio and video packets obtain their receive time mark from the dating module (MD2). Then the marked packets are transmitted to the processing module MT2 which determines the associated time difference (ET) and corresponding delay. The audio packets are then stored in the buffer memory (M2) of the processing module (MT2), while the video packets are immediately transmitted to the link module (ML2) so that it can transmit them to the video application module (MAV2) of the second computer (PC2), via the internal link (L5). Once the delay associated with an audio packet has expired, the processing module (MT2) extracts it from the buffer memory (M2) and then sends it to the link module (ML2) so that it can transmit it to the second mobile telephone (TM2) via the IP-LAN link (L4).

An identical processing mechanism is implemented in respect of the first device (D1) for the audio and video packets emitted from the second device (D2) and intended for the first mobile telephone (TM1) and the video application module (MAV1) of the first computer (PC1).

A second way concerns the situation in which the two users have set up an IP-LAN video link (L7) between their computers (PC1 and PC2), via their IP-LAN communication interfaces (not shown) and the local network instituted in the IP network (N). Each computer (PCi) then knows the IP address of the other computer (PCj).

At a given instant, the users decide to communicate audio data to each other via their mobile telephones (TM1 and TM2), at the same time as video data.

The computers (PC1 and PC2) then exchange the IP addresses of the mobile telephones (TM1 and TM2) with which they are going to be associated respectively. These IP addresses have been supplied to them by their respective users or by a call server, or have been extracted from a memory of each computer (PCi). Each computer (PCi) then establishes an IP-LAN link with the associated mobile telephone (TMi) in order to indicate to it that it wishes to establish a multimedia (audio/video) communication with another mobile telephone (TMj) and another computer (PCj), for which it is supplying the received IP addresses. What follows is then identical to that which has been described above for the first way.

The above is a description, with reference to FIG. 1, of an example of implementation in which the link between the mobile telephone (TMi) and the computer (PCi) is of the IP-LAN type. However it is possible to envisage a variant in which this link is of the Ethernet type. In this case, the mobile telephone (TMi) and the computer (PCi) include communication interfaces of the IP-LAN type and of the Ethernet type.

Figure 2:
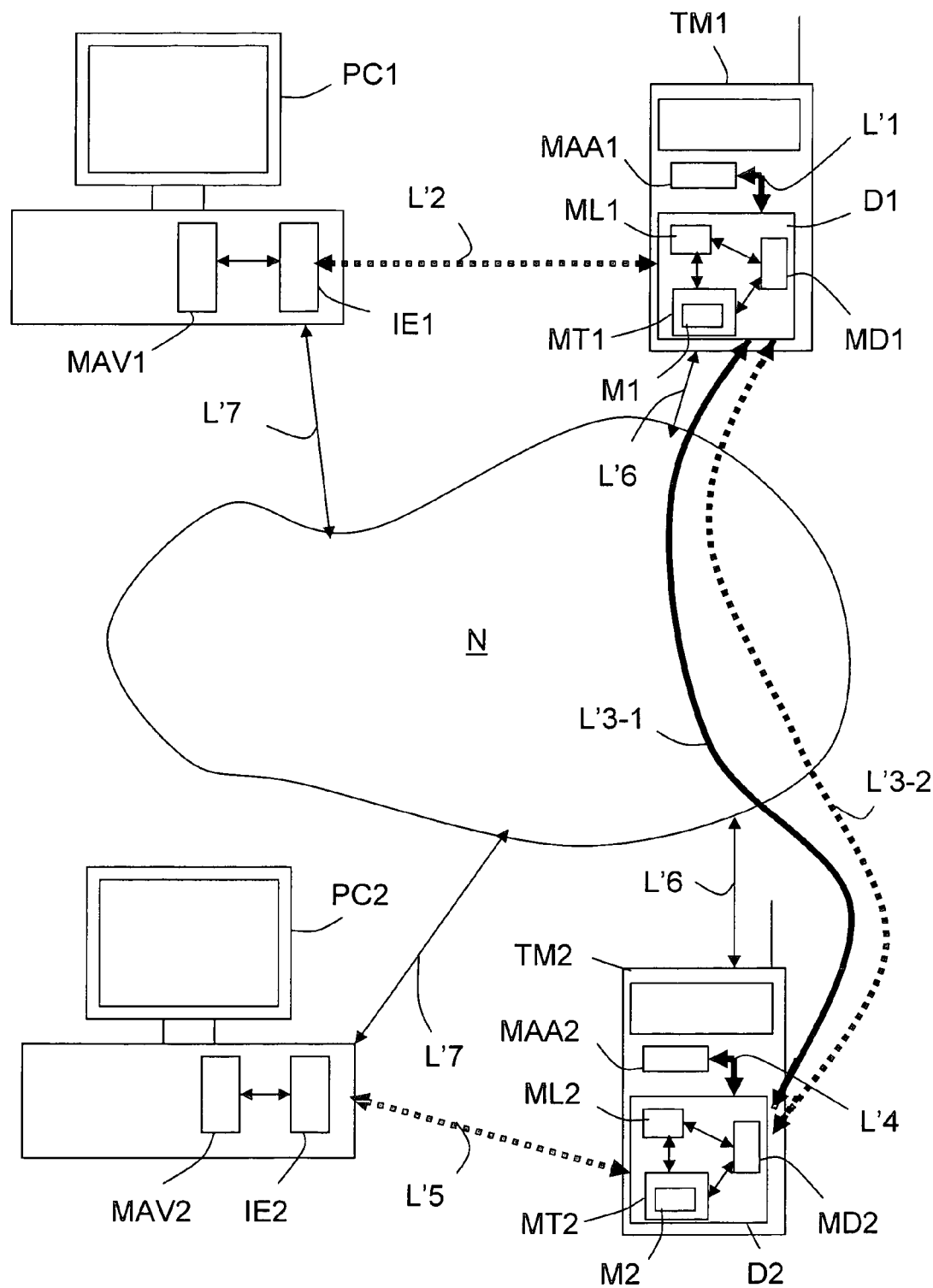

Reference is now made to FIG. 2 in order to describe an example of implementation of devices according to the invention, installed in the mobile telephones (TMi) of users.

Each mobile telephone (TMi) is equipped with a processing device (Di) according to the invention, which is virtually identical to that described previously with reference to FIG. 1, and coupled to an audio application module (MMi) and to an interface of the Ethernet type (not shown).

In addition, each computer (PCi) includes a video application module (MAVi) coupled to an Ethernet interface (IEi) allowing it to exchange video data directly with the mobile telephone (TMi) without traversing the IP network (N). arrangement (Di-the first, for example) is here charged, when its user wishes to exchange both audio data and video data with the other user (employing methods which will be detailed later) to establish, firstly, an internal link (L'1 or L'4) with the audio application module (MAAi), secondly, an Ethernet link (L'2 or L'5) with the video application module (MAVi) of the computer (PCi) for transmission of the video data via the Ethernet interfaces, and thirdly, two IP-LAN links (L'3-1 and L'3-2) with the link module (MLj) of the other device (Dj-installed in computer PCj) for transmission of the audio data and the video data via IP-LAN interfaces (not shown).

The Ethernet link (L'2 or L'5) runs directly from the computer (PC1 or PC2) to the mobile telephone (TM1 or TM2) via their Ethernet interfaces, so that it is of the deterministic type. Since the internal link (L'1 or L'4) is set up within the mobile telephone (TM1 or TM2), it is also of the deterministic type. On the other hand, since the IP-LAN links (L'3-1 and L'3-2) between the first (D1) and second (D2) devices are set up via routes over the IP network (N) which cannot be known in advance, they are of the non-deterministic (or random) type.

Calculation of the time differences (ET) by a processing module (MTi) is identical to that presented above with reference to FIG. 1. Only the simplified relation of this time difference (ET) is different, and since here it is the transmission times (T'1 and T'4) which are negligible due to the fact that the device (Di) and the audio application module (MAAi) are installed in a single mobile telephone (TMi). In this case, it can be re-written as:

$$ET = \Delta T'3 + TCDV - TCDA + T'2 + T'5$$

where, $\Delta T'3 = T'3\text{-}2 - T'3\text{-}1$.

In this example, use of the devices (Di) can again be effected in at least two ways.

A first way concerns the situation in which the two users have set up an audio IP-LAN link (L'6) between their mobile telephones (TM1 and TM2), via their IP-LAN communication interfaces and the local network instituted in the IP network (N). Each mobile telephone (TMi) then knows the IP address of the other mobile telephone (TMj).

At a given instant, the users decide to communicate video data to each other via their computers (PC1 and PC2), at the same time as audio data.

The mobile telephones (TM1 and TM2) then exchange the IP addresses of the computers (PC1 and PC2) with which they are going to be associated respectively, via the IP-LAN links (L'6). These IP addresses have been supplied to them by their respective users or by a call server, or have been extracted from a memory of each mobile telephone (TMi). Each mobile telephone (TMi) then establishes an Ethernet link with the associated computer (PCi), in order to indicate to it that it wishes to establish a multimedia (audio/video) communication with another computer (PCj), for which it is supplying the received IP address, via the device (Di) that it accommodates. Each computer (PCi) then activates the resources necessary for this communication. Since the device (Di) is alerted by the mobile telephone (TMi), in which it is installed here, its link module (MLi) then establishes the internal link (L'1 or L'4) with the audio application module (MAAi), the Ethernet link (L'2 or L'5) with the computer (PCi), as well as the IP-LAN audio and video links (L'3-1 and L'3-2) with the link module (MLj) of the other device (Dj).

Once these links have been set up, the audio application module (MMi) of the mobile telephone (TMi-TM1 for example) and the video application module (MAVi) of the computer (PCi-PC1 for example) can then simultaneously communicate their audio and video data packets, via the internal links (L'1) and Ethernet links (L'2), to the link module (MLi-ML1 for example), which transmits them to the dating module (MDi-MD1 for example) to which it is coupled. As they arrive, the audio and video packets receive their transmit time mark, their stream identifier and their VLAN identifier (and possibly the priority-level data) from the dating module (MD1). Then the marked packets are again transmitted to the link module (ML1) so that it can transmit them to the link module (ML2) of the receiving device (D2) over the IP-LAN audio and video links (L'3-1 and L'3-2) according to their nature (audio or video).

On receipt of these packets, the link module (ML2) transmits them to the dating module (MD2) to which it is coupled. As they arrive, the audio and video packets obtain their receive time mark from the dating module (MD2). Then the marked packets are transmitted to the processing module (MT2) which determines the associated time difference (ET) and the corresponding delay. The audio packets are then stored in the buffer memory (M2) of the processing module (MT2), while the video packets are immediately transmitted to the link module (ML2) so that it can transmit them, via the Ethernet link (L'5), to the video application module (MAV2) of the second computer (PC2). Once the delay associated with an audio packet has expired, the processing module (MT2) extracts it from the buffer memory (M2) and then transmits it to the link module (ML2) so that it, in turn, can transmit it to the audio application module (MAA2) of the second mobile telephone (TM2), via the internal link (L'4).

An identical processing mechanism is implemented in respect of the first device (D1) for the audio and video packets emitted from the second device (D2) and intended for the first mobile telephone (TM1) and the video application module (MAV1) of the first computer (PC1).

A second way concerns the situation in which the two users have set up an IP-LAN video link (L'7) between their computers (PC1 and PC2), via their IP-LAN communication interfaces (IC1 and IC2) and the local network instituted in the IP network (N). Each computer (PCi) then knows the IP address of the other computer (PCj).

At a given instant, the users decide to communicate audio data to each other via their mobile telephones (TM1 and TM2), at the same time as video data.

The computers (PC1 and PC2) then exchange the IP addresses of the mobile telephones (TM1 and TM2) with which they are going to be associated respectively. These IP addresses have been supplied to them by their respective users or by a call server, or have been extracted from a memory of each computer (PCi). Each computer (PCi) then establishes an IP-LAN link with the associated mobile telephone (TMi), in order to indicate to its device (Di) that it wishes to establish a multimedia (audio/video) communication with another mobile telephone (TMj) and another computer (PCj), for which it is supplying the received IP addresses. What follows is then identical to that which has been described above for the first way.

The above is a description, with reference to FIG. 2, of an example of implementation in which the link between the mobile telephone (TMi) and the computer (PCi) is of the Ethernet type. However it is possible to envisage a variant in which this link is of the IP-LAN type. In this case, the mobile telephone (TMi) and the computer has only IP-LAN communication interfaces.

Figure 3:
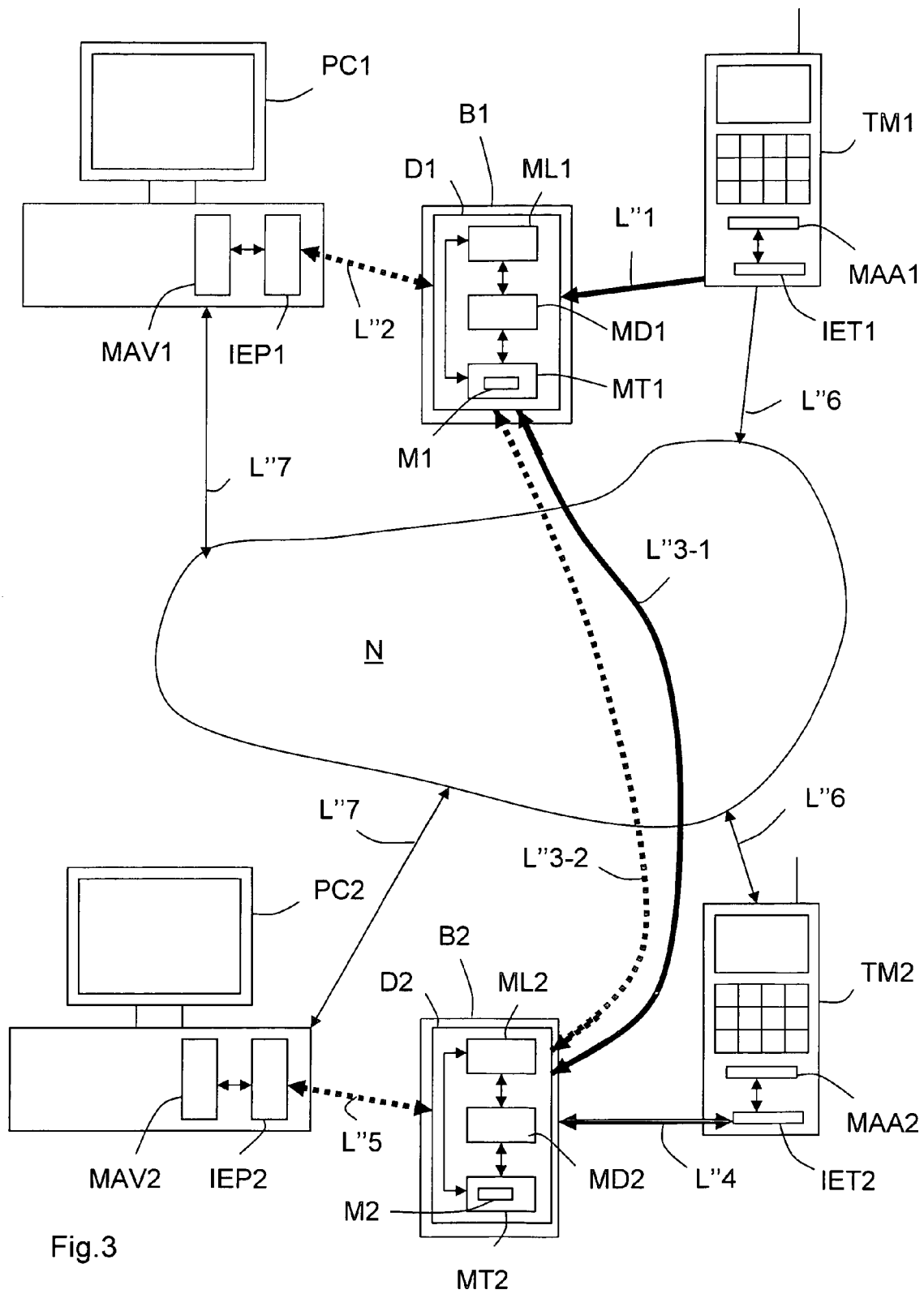

Reference is now made to FIG. 3, in order to describe an example of implementation of devices according to the invention, installed in dedicated communication units (Bi).

Each mobile telephone (TMi) is here equipped with an audio application module (MAAi) coupled to an IP-LAN interface (not shown) and to an Ethernet interface (IETi). In addition, each computer (PCi) includes a video application module (MAVi) coupled to an IP-LAN communication interface (not shown) and to an Ethernet interface (IEPi).

Each communication unit (Bi) includes a processing device (Di) according to the invention, which is virtually identical to that described previously with reference to FIGS. 1 and 2, and coupled to communication interfaces. In the illustrated example, the unit (Bi) is more precisely equipped with Ethernet interfaces (not shown), connected to the Ethernet interfaces (IETi and IEPi) of the mobile telephone (TMi) and of the computer (PCi), and IP-LAN interfaces (not shown) coupled to the IP network (N).

However the dedicated unit (Bi) can also take the form of a communication card installed in a server of the IP network (N) and consisting only of a device (Di) coupled to an IP-LAN interface.

The link module (MLi) of a device (Di—the first, for example) is here programmed, when its user wishes to exchange both audio data and video data with the other user (employing methods which will be detailed later) to establish, firstly, an Ethernet link (L'1 or L'4) with the audio application module (MAAi) of the mobile telephone (TMi) for transmission of the audio data via the Ethernet interfaces, secondly, an Ethernet link (L'2 or L'5) with the video application module (MAVi) of the computer (PCi) for transmission of the video data via the Ethernet interfaces, and thirdly, two IP-LAN links (L'3-1 and L'3-2) with the link module (MLj) of the other device (Dj-installed in computer PCj) for transmission of the audio and video data via the IP-LAN interface (not shown).

The Ethernet link (L'1) runs directly from the mobile telephone (TMi) to the unit (Bi) via their Ethernet interfaces, so that it is of the deterministic type. Likewise, the Ethernet link (L'2) runs directly from the computer (PCi) to the unit (Bi) via their Ethernet interfaces, so that it is of the deterministic type. On the other hand, the IP-LAN links (L'3-1 and L'3-2) between the first (Dl) and second (D2) devices set up over routes of the IP network (N) which cannot be known in advance, they are of the non-deterministic (or random) type.

Calculation of the time differences (ET) by a processing module (MTi) is identical to that presented above with reference to FIG. 1. When the transmission times (T"1 and T"2 or T"4 and T"5) for the Ethernet links (L'1) and L'2 or L'4 and L'5) are virtually identical, the simplified relation of the time difference (ET) can be re-written as follows:

$$ET = \Delta T''3 + TCDV - TCDA$$

where, $\Delta T''3 = T''3\text{-}2) - T''3\text{-}1$.

In this example, use of the devices (Di) can again be effected in at least two ways.

A first way concerns the situation in which the two users have set up an audio IP-LAN link (L'6) between their mobile telephones (TM1 and TM2), via their IP-LAN communication interfaces and the local network instituted in the IP network (N). Each mobile telephone (TMi) then knows the IP address of the other mobile telephone (TMj).

At a given instant, the users decide to communicate video data to each other via their computers (PC1 and PC2), at the same time as audio data.

The mobile telephones (TM1 and TM2) then exchange the IP addresses of the computers (PC1 and PC2) with which they are going to be associated respectively, via the IP-LAN links (L'6). These IP addresses have been supplied to them by their respective users or by a call server, or have been extracted from a memory of each mobile telephone (TMi). Each mobile telephone (TMi) then establishes an Ethernet link with the unit (Bi) in order to indicate to it that it wishes to establish a multimedia (audio/video) communication with another computer (PCj) and the mobile telephone (TMj), for which it is supplying the IP addresses. The unit (Bi) then establishes an Ethernet link with the computer (PCi) in order to indicate to it that the mobile telephone (TMi) wishes to establish a multimedia (audio/video) communication with the computer (PCj) and the mobile telephone (TMj). The computer (PCi) then activates the resources necessary for this communication. The device (Di) of the unit (Bi) then establishes, by means of its link module (MLi), the Ethernet link (L'1) (or L'4) with the audio application module (MAAi) of the mobile telephone (TMi), the Ethernet link (L'2) (or L'5) with the video application module (MAVi) of the computer (PCi), and the IP-LAN audio and video links (L'3-1 and L'3-2) with the link module (MLj) of the other device (Dj).

Once these links have been set up, the audio application module (MAAi) of the mobile telephone (TMi-TM1 for example) and the video application module (MAVi) of the computer (PCi-PC1 for example) can then simultaneously communicate their audio and video data packets, via the Ethernet links (L'1 and L'2), to the link module (MLi-ML1 for example), which transmits them to the dating module (MDi-MD1 for example) to which it is coupled. As they arrive, the audio and video packets receive their transmit time mark, their stream identifier and their VLAN identifier (and possibly the priority-level data from the dating module (MD1). Then the marked packets are again transmitted to the link module (ML1) so that it can transmit them to the link module (ML2) of the receiving device (D2) over the IP-LAN audio and video links (L'3-1 and L'3-2) according to their nature (audio or video).

On receipt of these packets, the link module (ML2) transmits them to the dating module (MD2) to which it is coupled. As they arrive, the audio and video packets obtain their receive time mark from the dating module (MD2). Then the marked packets are transmitted to the processing module (MT2) which determines the associated time difference (ET) and corresponding delay. The audio packets are then stored in the buffer memory (M2) of the processing module (MT2), while the video packets are immediately transmitted to the link module (ML2) so that it can transmit them, via the Ethernet link (L'5), to the video application module (MAV2) of the second computer (PC2). Once the delay associated with an audio packet has expired, the processing module (MT2) extracts it from the buffer memory (M2) and then transmits it to the link module (ML2) so that it, in turn, can transmit it to the audio application module (MAA2) of the second mobile telephone (TM2), via the Ethernet link (L'4).

An identical processing mechanism is implemented in respect of the first device (D1) for the audio and video packets emitted from the second device (D2) and intended for the first mobile telephone (TM1) and for the video application module (MAV1) of the first computer (PC1).

A second way concerns the situation in which the two users have set up an IP-LAN video link (L'7) between their computers (PC1 and PC2), via their IP-LAN communication interfaces (IC1 and IC2) and the local network instituted in the IP network (N). Each computer (PCi) then knows the IP address of the other computer (PCj).

At a given instant, the users decide to communicate audio data to each other via their mobile telephones (TM1 and TM2), at the same time as video data.

The computers (PC1 and PC2) then exchange the IP addresses of the mobile telephones (TM1 and TM2) with which they are going to be associated respectively. These IP addresses have been supplied to them by their respective users or by a call server, or have been extracted from a memory of each computer (PCi). Each computer (PCi) then establishes an IP-LAN link with the associated mobile telephone (TMi) in order to indicate to its device (Di) that it wishes to establish a multimedia (audio/video) communication with another mobile telephone (TMj) and another computer (PCj), for which it is supplying the received IP addresses. What follows is then identical to that which has been described above for the first way.

The above is a description, with reference to FIG. 3, of an example of implementation in which the links between the unit (Bi) and the mobile telephone (TMi), on the one hand, and between the unit (Bi) and the computer (PCi), on the other hand, are of the Ethernet type. However it is possible to envisage a first variant in which these two links are of the IP-LAN type. In this case, the unit (Bi), the mobile telephone (TMi), and the computer (PCi) have only IP-LAN communication interfaces. On can also envisage a second variant in which one of the two links is of the Ethernet type while the other link is of the IP-LAN type.

The processing device (Di) according to the invention can be implemented in the form of electronic circuits, software (computer) modules, or a combination of circuits and software. It is preferable to implement it by means of software modules due to the fact that it is intended to execute processes for application protocols whose level is above level four of the OSI layer model.

The invention is not limited to the methods of implementation of the processing device, of the audio communication terminal, of the video communication terminal and of the dedicated communication unit described above as an example only, but covers all variants which can be envisaged by the professional engineer in the context of the following claims Thus examples of implementation suitable for communication via an asynchronous IP protocol network have been described. However the invention is not limited to these asynchronous networks only. It concerns, in a general manner, all of the networks referred to as "packet-switched" networks, in which the transmission of streams of audio or video data packets is of the non-deterministic type.

The invention claimed is:

1. Audio and video data processing device for multimedia communication, via an asynchronous network with random transmission times, between a first pair consisting of a first audio communication terminal and a first video communication terminal, a second pair consisting of a second audio communication terminal and a second video communication terminal, the said terminals being of the LAN type, where at least the first pair consists of independent and asynchronous terminals, and the processing device includes, in association with this first pair, a first connector which sets up of:
   a video link between the first connector and the video terminal of the first pair,
   an audio link between the first connector and the audio terminal of the first pair,
   a video link between the first connector and the second pair, and
   an audio link between the first connector and the second pair,
   wherein the first connector synchronizes audio and video data according to a delay,
   wherein the video packets are transmitted without delay, and the audio packets are delayed for a predetermined time period,
   wherein the first connector attaches a first transmit time mark and at least one of a first stream identifier and a first virtual local area network (VLAN) identifier to audio and video data coming from the first audio communication terminal and the first video communication terminal respectively before their transmission to the second pair via a local network and attaches a receive time mark to the audio and video data coming from the second pair and containing at least one of a second stream identifier and a second VLAN identifier and a second transmit time mark, and
   wherein the predetermined time period is a transmission time difference between the audio data and the video data.

2. The device according to claim 1, wherein the said first connector further includes:
   processor which determines a time difference representing the transmission time difference between the received audio and video data and having a same stream identifier or a same VLAN identifier from their respective transmit and receive time marks, and then delays, by a value representing the said time difference, the transmission of the said received audio data at the said first audio communication terminal in relation to the transmission of the said received video data at the said first video communication terminal.

3. The device according to claim 2, wherein the processor determines a time difference which represents the said transmission time difference and a coding and decoding time difference between the received audio and video data and having the same stream identifier or the same VLAN identifier.

4. The device according to claim 2, wherein the processor determines the said time difference from the transmit and receive time markings of the said received audio and video data, and from values representing their respective transmission times between the second audio and video communication terminals of the second pair which transmitted them, and a second connector associated with the second pair.

5. The device according to claim 4, wherein the said links between the second audio and video communication terminals and the second connector associated with the second pair are determined by the transmit and receive time markings of the received audio and video data.

6. The device according to claim 2, wherein the processor is arranged to determine the said time difference from the transmit and receive time markings of the said received audio and video data, and from values representing their respective transmission times between the first connector and the first audio and video communication terminals for which they are intended.

7. The device according to claim 6, wherein the said links between the first connector and the first audio and video communication terminals are determined by the transmit and receive time markings of the received audio and video data.

8. The device according to claim 2, wherein representing a priority level is attached to the said audio data and video data to be transmitted to a second connector associated with the second pair.

9. The device according to claim 8, wherein the said priority level associated with the said video data is lower than the said priority level associated with the said audio data.

10. The device according to claim 1, wherein the first connector supports the said audio data and video data.

11. The device according to claim 1, wherein the audio communication terminal includes a processing device.

12. The device according to claim 1, wherein the video communication terminal includes a processing device.

13. The device according to claim 1, wherein the communication unit includes a processing device.

14. The device of claim 1 wherein the synchronization of audio and video occurs once at the first connector and once at the first pair and the second pair.

15. The device according to claim 1, wherein the video data is transmitted from one of the first video communication terminal and the second video communication terminal to a receiving terminal of one of the first video communication terminal and the second video communication terminal without delay, and the audio data is delayed by the predetermined time before being transmitted to a receiving audio communication terminal.

* * * * *